United States Patent [19]

Halstead

[11] E Re. 28,462

[45] Reissued July 1, 1975

[54] BALL THROWING MACHINE

[75] Inventor: Earl W. Halstead, St. Petersburg, Fla.

[73] Assignee: Tru-Pitch, Inc., St. Petersburg, Fla.

[22] Filed: Aug. 14, 1973

[21] Appl. No.: 388,249

Related U.S. Patent Documents

Reissue of:

[64] Patent No.: 3,724,437
Issued: Apr. 3, 1973
Appl. No.: 92,080
Filed: Nov. 23, 1970

[52] U.S. Cl. ..... 124/1; 273/26 D
[51] Int. Cl. ..... F41b 15/00
[58] Field of Search ..... 124/1, 6, 4, 32, 49, 50, 124/30 R, 26–29; 273/26 D, 29

[56] References Cited

UNITED STATES PATENTS

| | | | |
|---|---|---|---|
| 621,440 | 2/1899 | Bailey et al. | 124/29 UX |
| 2,112,611 | 3/1938 | Snippen | 273/26 D |
| 2,474,054 | 6/1949 | Jones | 124/32 X |
| 2,716,973 | 9/1955 | Desi | 124/1 |
| 3,465,742 | 9/1969 | Herr | 124/11 |
| 3,467,073 | 9/1969 | Rhodes | 124/30 R |
| 3,538,900 | 11/1970 | Samuels | 124/1 |
| 3,604,409 | 9/1971 | Doeg | 273/26 D X |

*Primary Examiner*—Richard C. Pinkham
*Assistant Examiner*—William R. Browne
*Attorney, Agent, or Firm*—Michael, Best & Friedrich

[57] ABSTRACT

A ball is introduced on a track into the nip between two counter-rotating wheels which throw the ball. Separate variable speed motors drive the wheels and control the speed of the thrown ball and, as a result of the relative speeds of the wheels, impart a spin to the ball to produce a curve, slider, etc. A control system is arranged to automatically and repeatably select the relative speeds of the motors to provide the type and/or speed of the pitch desired. A univeral joint arrangement allows pivotal movement of the wheel supporting structure about three axes for controlling and repeatably selecting the direction of the thrown ball. Ball-engaging portions of the wheels and the surface of the ball track are constructed from low friction materials and are arranged to minimize discoloration of and damage to the ball. *A track for supporting a ball, while moving between the wheels, is positioned below a substantially horizontal plane passing through the center of the wheels. The ball supporting surface of the track is substantially parallel to the plane passing through the centers of the wheels.*

7 Claims, 3 Drawing Figures

2 Sheets-Sheet 1

Inventor
E. W. Halstead
By Bayard H. Michael
Attorney

Inventor
E. W. Halstead
By Bernard H. Michael
Attorney

BALL THROWING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a ball throwing machine, and more particularly, to a machine adapted for use as a practice machine for pitching balls to a batter and for throwing fly or ground balls to fielders.

2. Description of the Prior Art

Various ball throwing machines are known in the prior art and have found use in amusement parks, for team batting practice, in playground, etc. A number of prior art devices employ a swinging arm, a mechanical impact means or spring-loaded device to propel the ball. With such devices, considerable difficulty has been experienced in obtaining uniform control of the ball. Generally, these prior machines throw only "straight" balls—i.e., are incapable of throwing a curve, sliders, etc. Thus, their use has limited value for batting practice.

Other known ball throwing machines employ two counter-rotating wheels between which the ball passes and is propelled thereby. These machines did not have a system for repeatedly selecting the direction of the thrown ball. Also, these machines did not have a reliable system for repeatedly and automatically adjusting the relative speeds of the wheels to impart the necessary spin to the ball required to obtain the desired pitch.

Many of these prior art devices frequently damage or scuff the surface of the ball which not only reduces the life of the ball, but also effects the trajectory of the thrown ball. Preferably, the machine should not cause any adverse discoloration to the ball because any such spots "tip" the batter to the presence and degree of spin on the ball.

SUMMARY OF THE INVENTION

The ball throwing machine of this invention includes a support assembly, an adjustable frame assembly pivotally mounted to the support assembly, a pair of spaced counter-rotating wheels, a ball track positioned between the wheels, separate variable speed motors driving each wheel and a control system for adjusting the relative speeds of the wheels.

The wheels are spaced so that the distance between their peripheries is slightly less than the outside diameter of the ball to be thrown. The ball is introduced along the track into the nip between the two wheels and is propelled by the counter-rotating action of the wheels.

The adjustable frame assembly is provided with a universal joint arrangement which enables the plane of the wheels to be rotated about three axes to control the direction of the thrown ball. The plane of the wheels can be rotated around a horizontal transverse or X axis to adjust the elevation of the thrown ball, around a vertical or Y axis to adjust the horizontal direction of the thrown ball and around a horizontal longitudinal or Z axis to adjust the azimuth of the thrown ball. The wheels are adjusted about the three axes until the ball is thrown from the machine in the proper trajectory to obtain the desired pitch, e.g., low on the outside corner of the plate. Indexing means are provided so that, after the proper adjustments have been made, a desired direction of the thrown ball can be repeatedly selected by adjusting the wheels about each of the axes to previously noted settings.

The variable speed motors are connected to an electrical power supply through an electrical control circuit which includes a plurality of variable electrical input means, such as resistors having different ohmic ratings, a selector switch and associated wiring located on a control panel. The variable electrical input means are connected to the variable speed motors and the selector switch in such a manner that the electrical input to the motors is varied with switch position changes.

The portions of the ball propelling wheels which engage the ball are made from a resilient, low friction material, preferably a pneumatic tire, and are preferably constructed from a white-colored material, to minimize damage and discoloration to the ball. The ball track, preferably covered with a low friction material, such as Teflon or nylon, is arranged so that the center of the ball is located below the center of the ball engagement surfaces of the wheels. This ball location results in the ball being pressed downwardly against the track while engaged by the wheels and improves stability of the ball during flight. The low friction surface material on the ball track also minimizes scuffing and discoloration to the ball.

DESCRIPTION OF THE PREFERRED EMBODIMENT

Figure 3:
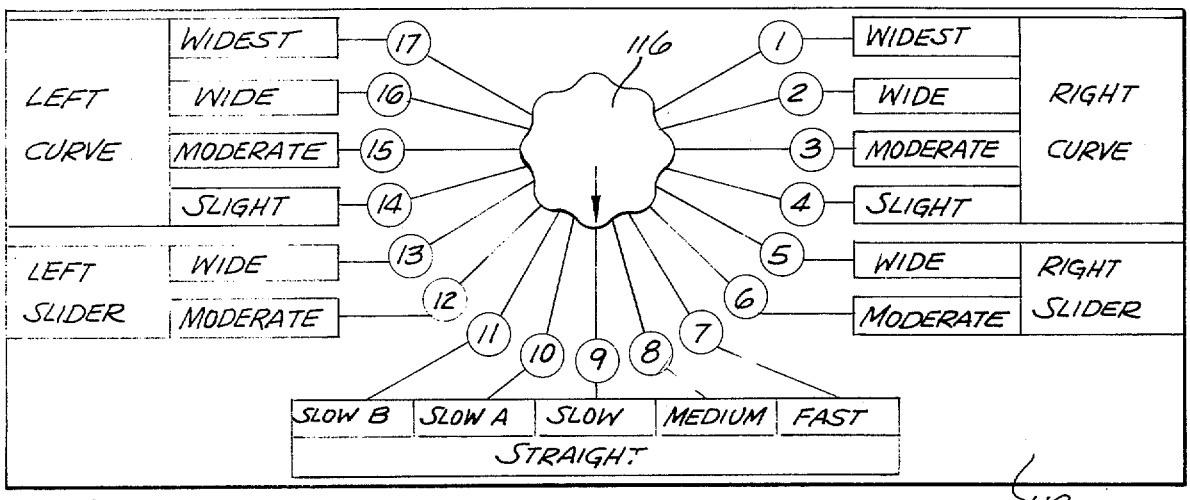
FIG. 3 is a top view of the control panel and control dial for selecting the desired pitch.
Figure 1:
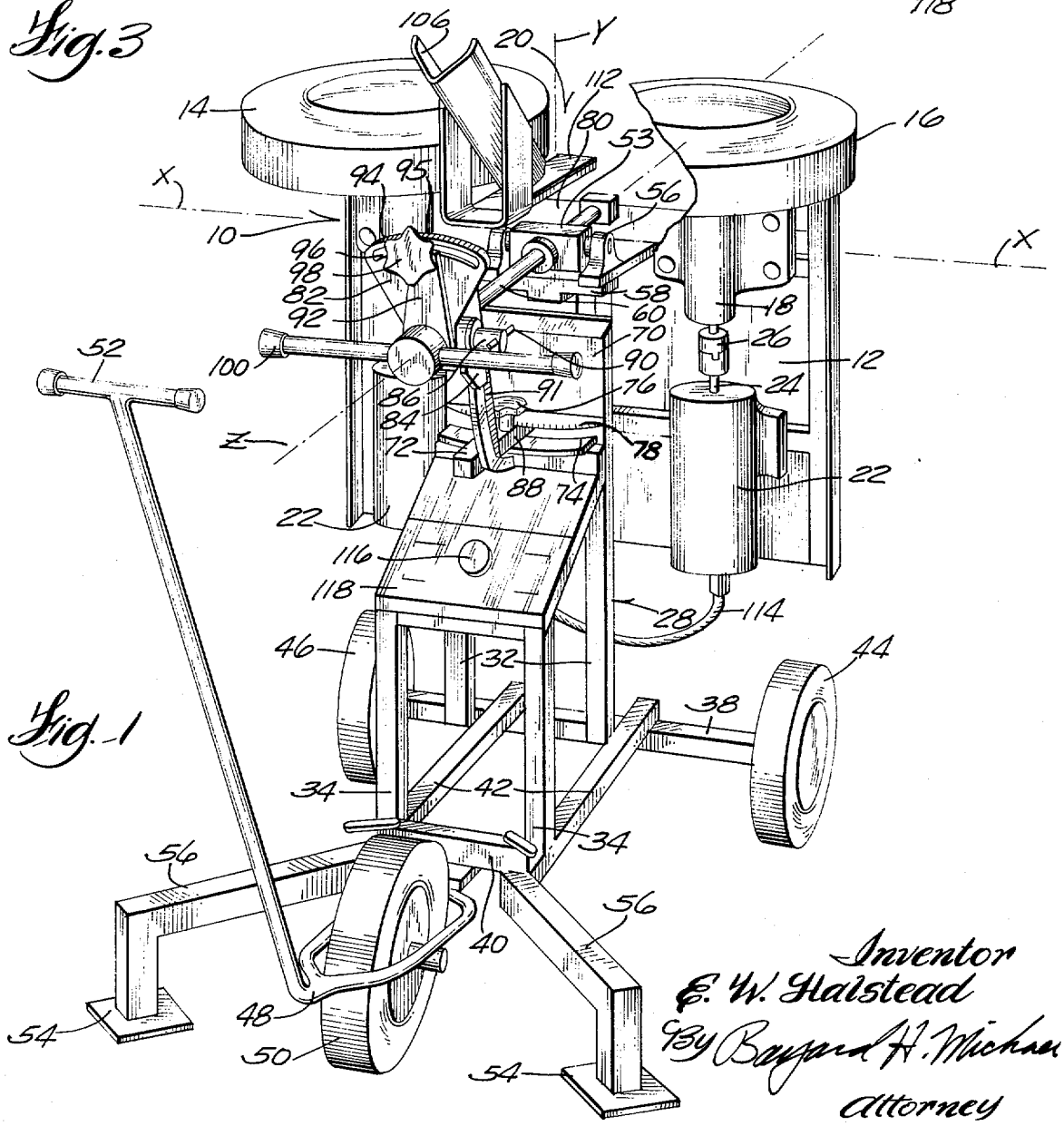
FIG. 1 is a perspective view, partially broken away, showing a ball throwing machine embodying the present invention.

In FIG. 1, ball propelling assembly 10 includes frame assembly 12, a pair of counter-rotating wheels 14, 16 rotatably mounted to frame assembly 12 by suitable bearing and mounting means 18, ball track 20 positioned between wheels 14, 16 and attached to frame assembly 12, and separate variable speed motors 22 attached to frame assembly 12. Motors 22 independently drive wheels 14, 16 via drive shaft 24 and flexible shaft coupling 26.

Frame assembly 12 is adjustably mounted to support assembly 28 by universal joint assembly 30. Support assembly 28 includes vertical members 32, 34, control panel 36 for selecting the desired pitch which is attached to vertical members 32, 34, transverse members 38, 40 attached to the lower ends of vertical members 32, 34, respectively, and longitudinal members 42 attached to the lower ends of vertical members 32, 34. A pair of wheels 44, 46 are rotatably mounted to transverse member 38 by an axle (not shown). Wheel 50 is rotatably attached to frame 48 which is swingably attached to transverse member 40. Handle 52 is provided at the upper end of frame 48 so that the machine can be moved by hand to and from the position of use. When the machine has been positioned for use, it is anchored by feet 54 located at the ends of legs 56. Wheels 44, 46 and 50 facilitate approximate positioning of the machine. Finer positioning of the direction of the thrown ball is accomplished by adjusting the ball propelling assembly 10.

Figure 2:
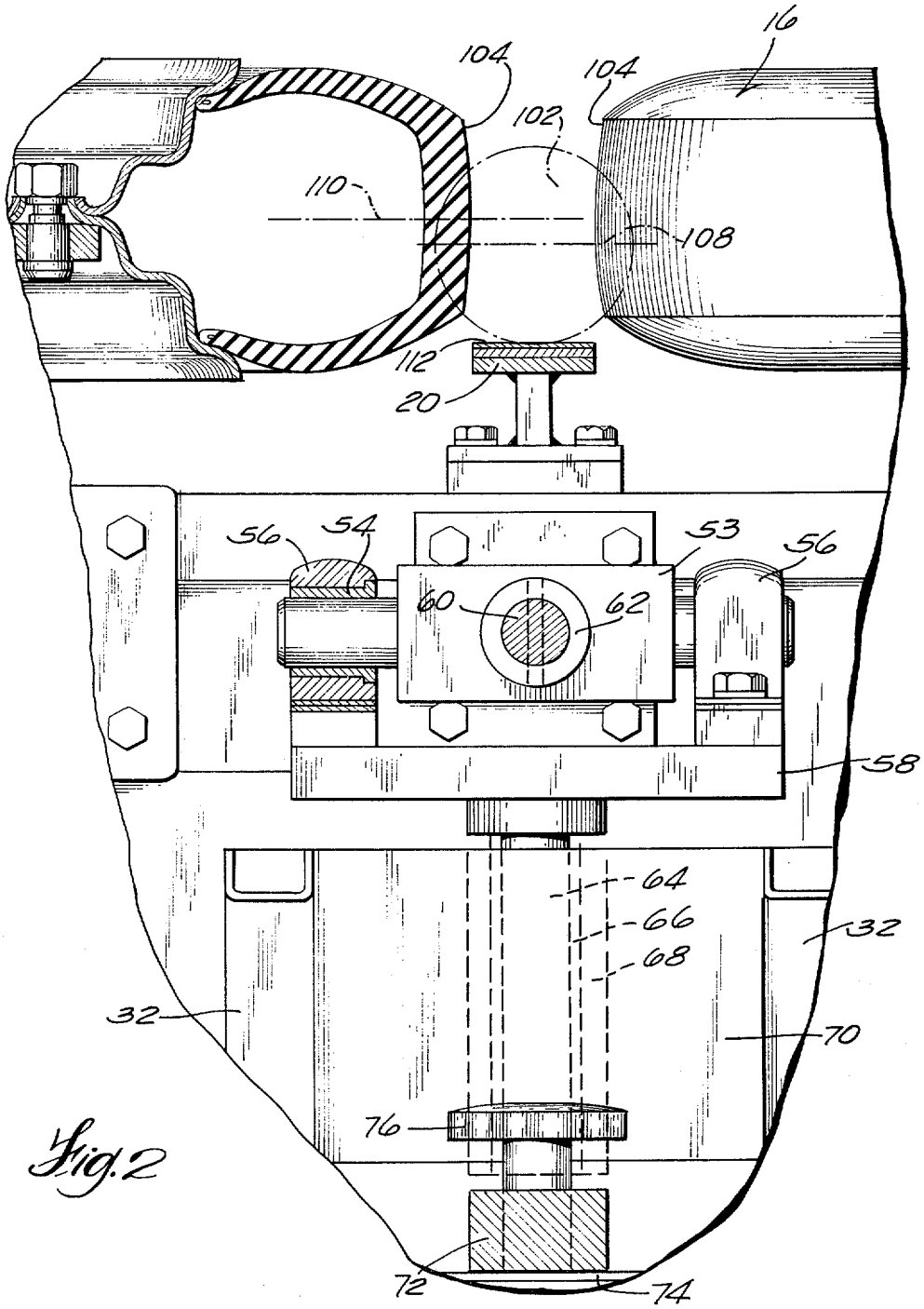
FIG. 2 is a partial front view, partially cross-sectioned, showing the ball in position on the ball track for engagement with the ball-propelling wheels.

As shown in FIG. 1 and 2, universal joint assembly 30, includes swivel block 53, a pair of pillow blocks 56, control shaft 60 and vertical shaft 64. Swivel block 53 is rotatably mounted via bearings 54 to pillow blocks 56 which are in turn mounted to plate 58. Control shaft 60 is attached to frame assembly 12 at 80 and is rotatably mounted via bearings 62 through swivel block 53. Vertical shaft 64 is attached at one end to plate 58 and is rotatably mounted via bearing 66 and housing 68 to frame 70 which in turn is attached to vertical members 32.

Ball propelling assembly 10 is rotated about a vertical axis, designated Y in FIG. 1, to make adjustments in the horizontal direction of the thrown ball. This is accomplished by lateral movement of adjustment arm 72 which is attached to the lower end of vertical shaft 64 and is in slidable engagement with platform 74. Adjustment arm 72 is locked in position by a suitable clamping means in clamping engagement with plate 74. To make an adjustment, the clamping force is relieved, by rotating hand wheel 76. Adjustment arm 72 is then moved relative to platform 74 thereby rotating vertical shaft 64. Since frame assembly 12 is attached to vertical shaft 64 through plate 58, pillow blocks 56, swivel 53 and control shaft 60, ball propelling assembly 10 rotates about axis Y as vertical shaft 64 rotates. After the desired horizontal direction adjustment of the ball propelling assembly has been made, hand wheel 76 is rotated to clamp adjustment arm 72 to platform 4. Index plate 78 extending from frame 70 parallel to platform 74 is provided for noting various settings of adjustment arm 72 corresponding to specific horizontal directions of the thrown ball.

Ball propelling assembly 10 is rotated about a horizontal transverse axis, designed X in FIG. 1, to make adjustments in the elevational direction of the thrown ball. One end of control shaft 60 is attached to frame assembly 12 at 80 and the other end is rotatably attached to bracket 82. Bracket 82 includes a flange 84 holding a suitable clamping means 86 in clamping engagement with vertical plate 88 which is attached to adjustment arm 72. To make an adjustment, handle 90, operably connected to clamping means 86, is rotated to relieve the clamping force on plate 88. Control shaft 60, with ball propelling assembly attached thereto at 80, is rotated about axis X as swivel blocks 58 rotates within pillow blocks 56. After the desired elevation adjustment of the ball propelling assembly has been made, bracket 82 is clamped to plate 88 by rotating handle 90. Vertical plate 88 includes index plate 91 for noting various settings of control shaft 60 to obtain specific elevational directions of the thrown ball. Plate 88 is arranged so that control shaft 60 can be lowered to positions where the machine can be employed to throw fly balls to the outfielder or raised to positions where ground balls are thrown.

Ball propelling assembly 10 is rotated about a longitudinal transverse axis, designated Z in FIG. 1, to make adjustments in the azimuth direction of the thrown ball. Arm 92, attached to the other end of control shaft 60, includes a suitable clamping means 94 in clamping engagement with bracket 82 through arcuate slot 96. To make an adjustment, hand wheel 98, operably connected to clamping means 94, is rotated to relieve the clamping force on bracket 82 and control shaft 60, with ball propelling assembly 10 attached thereto at 80, is rotated about axis Z by twisting handle 100. After the desired azimuthal adjustment of the ball propelling assembly has been made, hand wheel 98 is rotated to clamp arm 92 to bracket 82. The top edge of bracket 82 is provided with index plate 95 for noting various settings of arm 92 corresponding to specific azimuthal directions of the thrown ball. It can be readily appreciated that, for many pitches (especially curves and sliders), the ball propelling assembly may have to be adjusted about all three axes to obtain the proper trajectory for the thrown ball to pass through a specific portion of the strike zone.

As shown in FIG. 2, wheels 14, 16 are positioned so that the space between the peripheries thereof is slightly less than the diameter of ball 102. The ball-engaging portions 104 of wheels 14, 16 are constructed from a resilient material having a low coefficient of friction, preferably are pneumatic tires as shown in FIG. 2, to minimize scuffing of the ball. Wheels 14, 16 are provided with an adherent white coating, or preferably are fabricated from a white material, such as polyurethane, to preclude any discoloration of the ball. When pneumatic tires are used, the pressure for the two wheels must be maintained at substantially identical and prescribed levels in order to obtain a uniform delivery of the ball.

As shown in FIG. 1, inclined chute 106 is attached to ball track 20 for introduction of balls onto the track. Chute 106 is positioned so that the balls are discharged onto the track exactly into the center of the space between wheels 14, 16 so that the ball contacts ball-engaging portions 104 simultaneously. Balls are fed into the chute 106 manually or by suitable conventional automatic means, such as a conveyor system. Chute 106 is open at the top so that the batter can visually observe the ball being fed to the ball propelling assembly and get ready for the pitch.

Ball track 20 is positioned so that the center of the ball, designated as reference numeral 108, is below the center of wheels 14, 16, designated as reference numeral 110, so that the wheels tend to press the ball downwardly against the tracks. This action produces improved control over the flight over the thrown ball. If the ball were located with its center at or above the center of the ball engagement surfaces of the wheels, it may tend to rise and/or be influenced by irregularities in the track surface.

The top surface of track 20 is provided with a coating 112 of low friction material, such as Teflon, nylon and the like. Use of such materials with their low coefficient of friction minimizes scuffing of the ball and minimizes the effect of any surface irregularities on the trajectory of the ball. Also, the chemical inertness of such materials protect the surface of the ball track against corrosion when the machine is exposed to outside weather conditions, thereby minimizing discoloration to the ball.

Control panel 36 is used to control the speed of the motors and to make adjustments between their relative speeds. Mounted beneath the control panel 36 (and therefore not shown) are a plurality of resistors of different values, a rotary selector switch and associated electrical circuitry interconnecting the resistors, the motors and selector switch. Motors 22 are connected to control panel 36 by electrical leads 114. Control panel 36 also includes selector dial 116 and a pitch selector decal 118 indicating the proper dial setting for particular types of pitches. The electrical circuitry for accomplishing speed control of motors 22 is well within the scope of those ordinarily skilled in the art so is not illustrated or described in detail for the sake of brevity.

The speed of motors 22 depends upon the voltage supplied. Resistors having different ohmic ratings are connected to each motor through the selector switch to a power supply so that an appropriate voltage is supplied to the motors at different selector switch contactor positions. For example, when a medium straight ball is desired, dial 116 is set at position 8 designated "medium straight." At this switch position, each motor is connected to the power supply through the same size resistors, and therefore, drive the wheels at the same speed to produce a straight ball. For a slower fast ball, dial 116 is set at position 9 designated as "slow straight." At this position, each motor is connected to the power supply through resistors of the same size but with higher ohmic ratings. With a resultant lower voltage input, the motors drive the wheels at the same, but slower speed, and a slower straight ball is thrown. In order to provide a curve or slider, one wheel is driven faster than the other to impart the desired spin to the ball. This is accomplished by arranging the electrical circuitry so that, at the appropriate dial setting, each motor is connected to the power supply through resistors having different ohmic ratings. Since the speeds of the motors are proportional to the voltage input, their speeds will differ correspondingly and a spin is imparted to the ball. The degree of curvature of the thrown ball is varied by regulating the relative electrical input to the motors, i.e., a greater difference in speed of the wheels produces a wider curve.

For operation, the machine is first generally positioned to simulate the position of the pitcher. Ball propelling assembly 10 is then adjusted about the three axes as described above so that a ball is thrown in the proper trajectory to reach the plate in the desired location. For example, if a low, wide slider over the outside corner of the plate for a right hand batter is desired, dial 116 is set at position 13. The wheels are driven at the appropriate relative speeds to impart a spin on the ball making it break away from the batter. Horizontal, elevational and azimuthal adjustments are then made to the ball propelling assembly so that the trajectory of the thrown ball is over the low, outside corner of the plate. The settings of adjustment arm 72, control shaft 60 and arm 92 are noted on the corresponding index plates 78, 91 and 95. These settings are recorded for future reference. When other types of pitches at various positions within the strike zone is desired, similar directional adjustments are made to the ball propelling assembly and the settings on the index plates are recorded. Thereafter, the ball propelling assembly can be quickly positioned at the desire orientation to obtain a selected pitch by moving adjustment arm 72, control shaft 60 and arm 92 to the previously-noted settings.

I claim:

1. A ball throwing apparatus comprising a relatively fixed frame;

an adjustably positioned frame connected to said fixed frame;

a pair of ball propelling wheels mounted on said adjustable frame in substantially coplanar relation for rotation about spaced parallel axes with tread portions of said wheels disposed in operatively spaced relation for throwing a ball placed in the nip between said wheel treads;

separate variable speed motors driving said wheels in opposite directions;

means for introducing a ball to be thrown into the nip between said wheels; and means for adjusting the position of said adjustable frame with respect to said fixed frame to thereby change the position of said wheels to control the direction of the flight of a thrown ball, said adjusting means including, a universal joint assembly operatively connecting said adjustable frame to said fixed frame and said adjusting means further comprising a first shaft mounted on said fixed frame for rotation about a substantially vertical axis, a second shaft having one end thereof connected to said adjustable frame, means carried by said first shaft for supporting said second shaft for rotation of said second shaft about two horizontal axes perpendicularly disposed relative to each other, said vertical axis and said two horizontal, axes intersecting at a substantially common point; and means associated with said fixed frame for locking said adjustable frame into position after the desired adjustment about any one of said axes has been made.

2. Apparatus according to claim 1 including indication means operatively associated with said universal joint assembly and said fixed frame arranged to indicate the rotational position of said adjustable frame about each said axes as the position of said wheels is changed to change the direction of the thrown ball thereby providing the capability of repeatably selecting a predetermined direction of the thrown ball.

3. Apparatus according to claim 2 wherein said universal joint assembly includes said first shaft rotatably mounted to said fixed frame providing for pivotal movement of said adjustable frame about said vertical axis;

said support means for said second shaft including a swivel block rotatably mounted upon said support means and providing a horizontal longitudinal axis;

said second shaft rotatably mounted within and extending through said swivel block and providing a horizontal transverse axis, said one end of said second shaft carrying said adjustable frame;

means for adjustably rotating said first shaft relative to said fixed frame, thereby rotating said means for supporting said second shaft, said swivel block, and said adjustable frame about said vertical axis, to make adjustments in the horizontal direction of the thrown ball;

means for adjustably pivoting said second shaft relative to said fixed frame, thereby pivoting said swivel block and said adjustable frame about said horizontal longitudinal axis, to make adjustments in the elevation of the thrown ball; and means for adjustably rotating said second shaft relative to said swivel block, thereby rotating said adjustable frame about said horizontal transverse axis, to make adjustments in the azimuthal direction of the thrown ball.

4. The apparatus according to claim 3 wherein said means for adjustably rotating said first shaft includes horizontal platform fixably connected to said fixed frame;

an arm fixably connected to said first shaft; and first clamping means for releasably clamping said arm to said platform so that the rotation of said first shaft relative to said fixed frame can be selectively positioned to adjust the horizontal direction of the thrown ball.

5. The apparatus according to claim 4 wherein said means for adjustably pivoting said second shaft includes a vertical plate connected to said arm; and second clamping means, connected to the end portion of said second shaft opposite to the end carrying said adjustable frame, for releasably clamping said second shaft to said vertical plate so that the pivotal movement of said second shaft relative to said fixed frame can be selectively positioned to adjust the elevational direction of the thrown ball.

6. The apparatus according to claim 5 wherein said means for adjustably rotating said second shaft includes a bracket fixably connected to said vertical plate; and third clamping means, connected to the end portion of said second shaft opposite the end carrying said adjustable frame, for releasably clamping said second shaft to said bracket so that the rotation of said second shaft relative to said swivel means can be selectively positioned to adjust the azimuthal direction of the thrown ball.

*7. A ball throwing machine for batting and fielding practice comprising,*

*a fixed frame,*

*an adjustable frame,*

*universal joint means connecting the frames,*

*a pair of ball propelling wheels mounted on said adjustable frame in substantially coplanar relation for rotation about spaced parallel axes with tread portions of said wheels disposed in operatively spaced relation for throwing a ball placed in the nip between said wheel treads,*

*a track for supporting a ball to be projected, fixed to the adjustable frame between the wheels and positioned below a substantially horizontal plane passing through the centers of the wheels, and said track having a surface substantially parallel to the plane, said track surface being positioned below the plane at a distance in excess of the radius of a ball to be thrown so that a ball is forced against the track by the force exerted by the wheels,*

*a separate variable speed motor directly connected to each wheel and carried by the adjustable frame,*

*control means for selecting the speed of the motor whereby both may be operated at high speeds or low speeds or may be operated at different speeds,*

*said universal joint means allowing adjustment of the adjustable frame and wheels to permit varying the trajectory of a ball in combination with the speed and spin variation afforded by the variable speed motors and the control means whereby a wide range of pitches may be simulated,*

*and means for locking the adjustable frame relative to the fixed frame to retain a desired adjustment.*

* * * * *